United States Patent
Knowles

(10) Patent No.: US 11,391,553 B2
(45) Date of Patent: Jul. 19, 2022

(54) PRECISION AMMUNITION CARTRIDGE REAMING DEVICE

(71) Applicant: Steve Knowles, Bend, OR (US)

(72) Inventor: Steve Knowles, Bend, OR (US)

(*) Notice: Subject to any disclaimer, the term of this patent is extended or adjusted under 35 U.S.C. 154(b) by 0 days.

(21) Appl. No.: 17/231,812

(22) Filed: Apr. 15, 2021

(65) Prior Publication Data
US 2021/0325158 A1    Oct. 21, 2021

Related U.S. Application Data

(60) Provisional application No. 63/010,503, filed on Apr. 15, 2020.

(51) Int. Cl.
*F42B 33/10*    (2006.01)
*B23D 77/14*    (2006.01)

(52) U.S. Cl.
CPC .............. *F42B 33/10* (2013.01); *B23D 77/14* (2013.01)

(58) Field of Classification Search
CPC .................................. F42B 33/10; B23D 77/14
See application file for complete search history.

(56) References Cited

U.S. PATENT DOCUMENTS

| | | | | |
|---|---|---|---|---|
| 3,580,127 A | * | 5/1971 | Lee | F42B 33/005 86/24 |
| 4,468,829 A | * | 9/1984 | Christensen | A47L 25/00 15/104.001 |
| 4,723,472 A | * | 2/1988 | Lee | F42B 33/10 86/23 |
| 5,064,320 A | * | 11/1991 | Markle | B23B 5/167 408/202 |
| 7,650,825 B1 | * | 1/2010 | Lee | F42B 33/004 86/19.7 |
| 10,265,774 B1 | * | 4/2019 | Eldredge | F42B 33/10 |

FOREIGN PATENT DOCUMENTS

FR    2556261 A1 *    6/1985    ............... B23P 6/00

* cited by examiner

*Primary Examiner* — Joshua T Semick
(74) *Attorney, Agent, or Firm* — Donn K. Harms

(57) ABSTRACT

A precision ammunition cartridge reaming device employs a body die having an interior cavity into which an ammunition cartridge is insertable through a first end. A reaming tool rotationally powered is insertable into the interior cavity through a second end. Rotation of the reaming tool trims the interior of a neck area of the ammunition to form a concentric surface with the exterior thereof. The distal edge of the cartridge may also be trimmed by the reaming tool to form each sequentially inserted cartridge to an equal length.

10 Claims, 5 Drawing Sheets

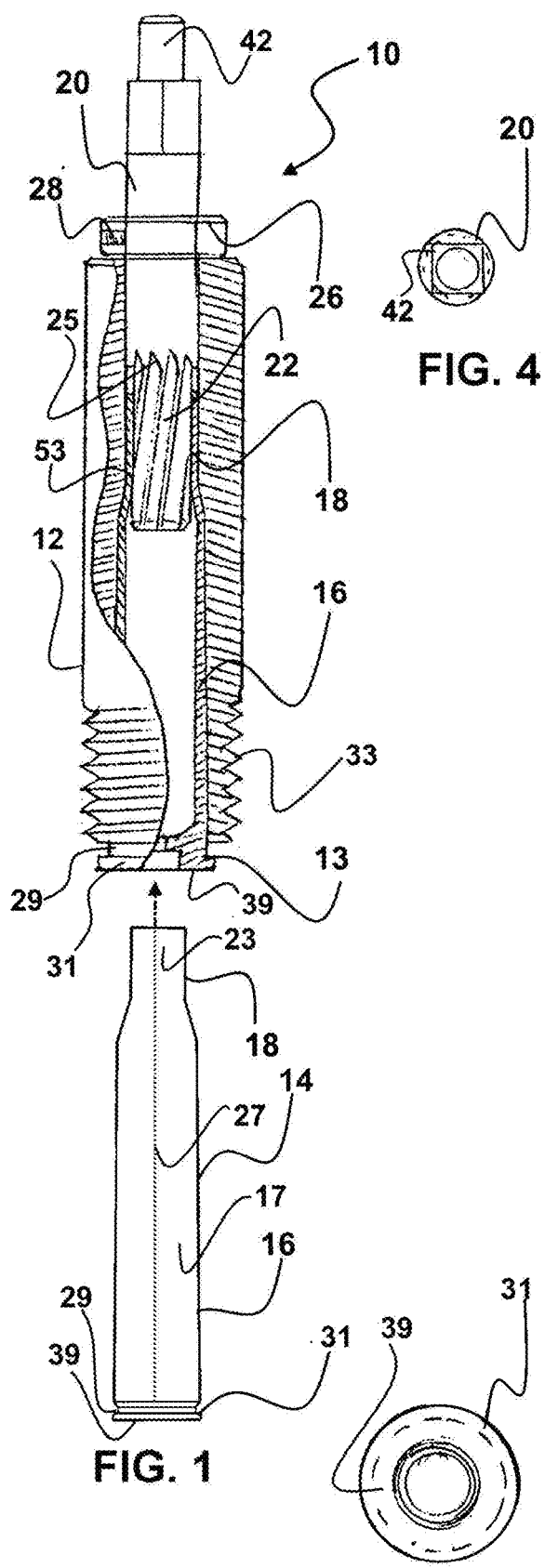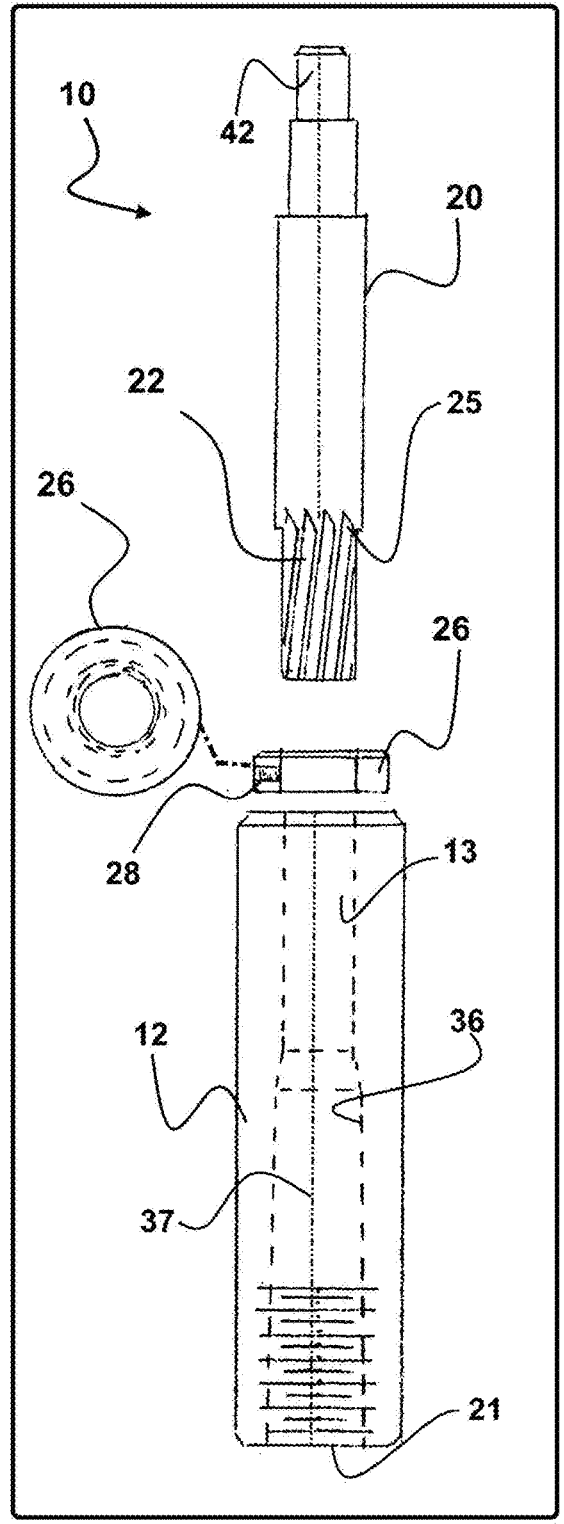
FIG. 1  FIG. 3  FIG. 4  FIG. 2

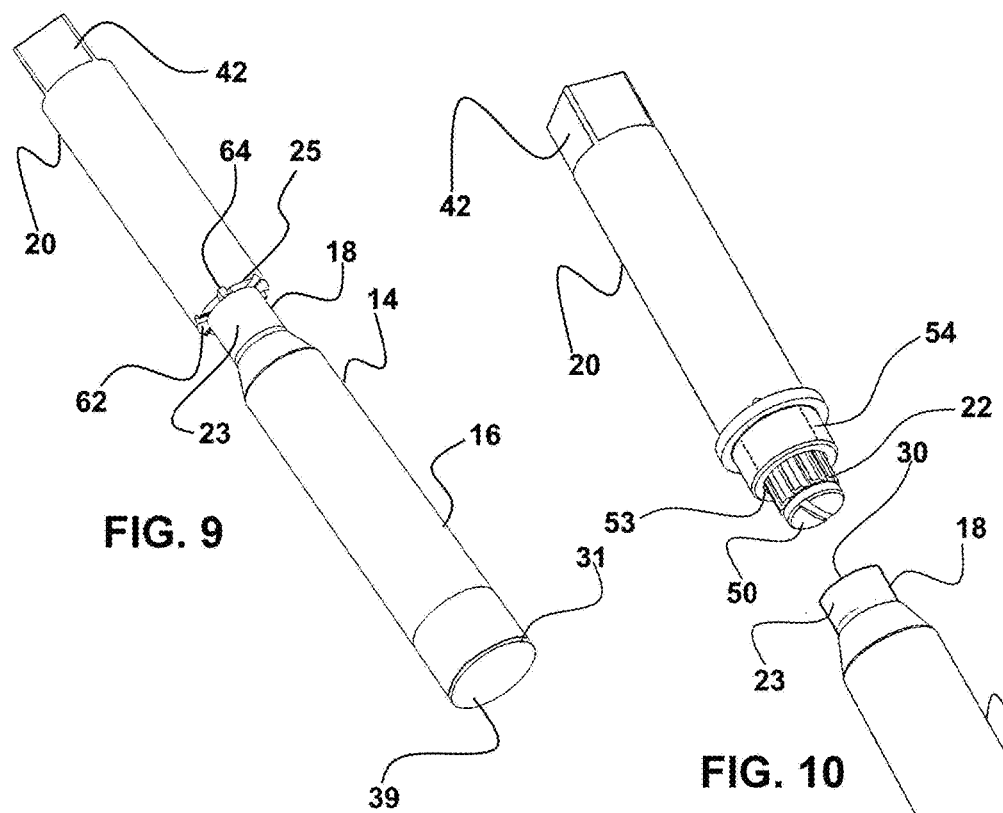
FIG. 9
FIG. 10
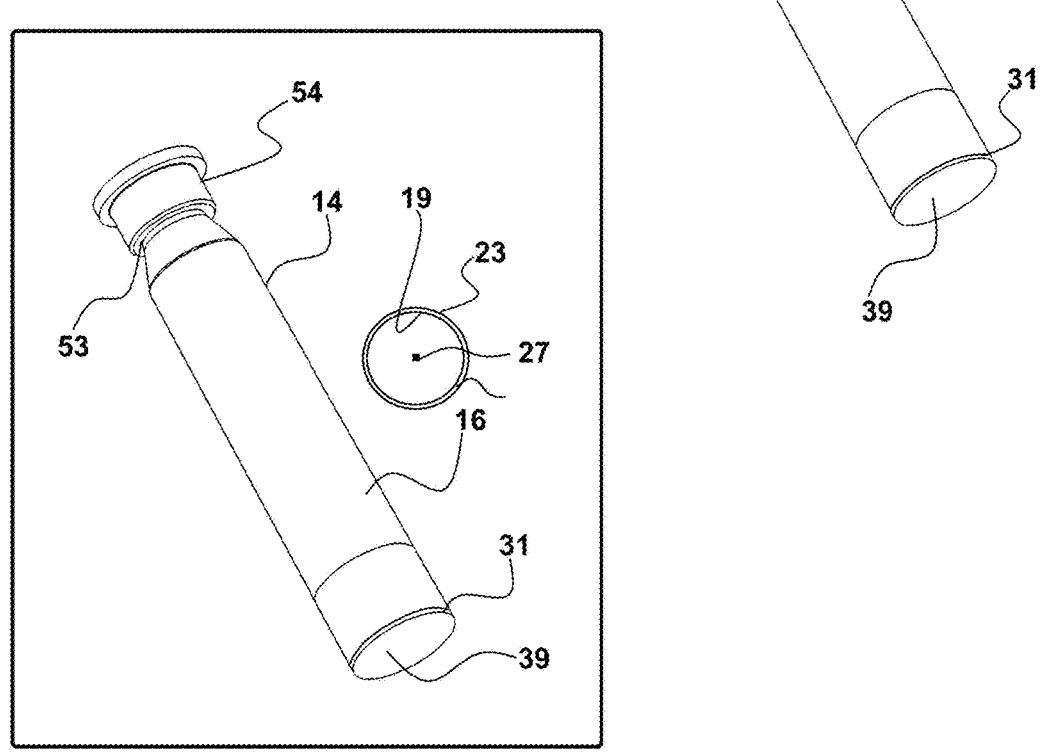
FIG. 11

PRECISION AMMUNITION CARTRIDGE REAMING DEVICE

This application claims priority to U.S. Provisional Patent application Ser. No. 63/010,503 filed on Apr. 15, 2020, which is incorporated herein in its entirety by this reference thereto.

BACKGROUND OF THE INVENTION

1. Field of the Invention

The present invention relates to ammunition for firearms. More particularly, the invention relates to an ammunition cartridge reaming tool which is engageable with a conventional reloading press and operates to ream the mandrel on the neck of a cartridge in a fashion which insures the concentricity of the reloaded ammunition cartridge relative to the barrel of the firearm as well as the length of the cartridge.

2. Prior Art

Modern firearm ammunition employs a metal cartridge which is a type of pre-assembled firearm ammunition. Such cartridge ammunition is assembled ready to fire, with a projectile such as a bullet engaged with a neck of the cartridge. Within an interior cavity of the cartridge, which is in communication with the opening in the neck in which the bullet engages, is positioned a propellent, such as smokeless powder or the like. At the rear of the cartridges is positioned a primer, which when impacted by a firing pin, will ignite the propellent within the interior cavity which propels the bullet from its frictional engagement within the neck of the cartridge, and down the barrel of the firearm.

While such commercially available cartridge ammunition is very reliable in modern firearms, and reasonably accurate when fired, in the competitive world of target shooting, small inaccuracies in the amount of the propellent in the cartridge, and with the shape of the cartridge, can impair the accuracy of the firearm. This is especially problematic in the sport of target shooting where fractions of an inch of bullets impacting a target can determine a match.

The sport of target shooting has been a popular sport for centuries. Because of the need for extreme accuracy during matches, when shooting targets at near and great distances, a majority of target shooting participants choose to configure and load their own ammunition. In doing so, they can be assured that each round of ammunition will perform exactly the same as the last, when they are involved in target shooting.

A major element in maintaining accuracy during target shooting is the absolute consistency and concentricity in all aspects of each and every ammunition cartridge. While accurate weighing and measuring of the propellent is easy to maintain when loading each cartridge, a significant problem is generally encountered with the consistency of the thickness of the wall of the brass cartridge itself which surrounds the bullet.

A technical problem, which has developed since the advent of metallic cartridge ammunition, is when during the manufacturing process of fire-forming, the brass forming the cartridge tends to migrate toward the opening in which the bullet is to be frictionally engaged. This migration, in turn, thickens the neck of the cartridge case. Unfortunately, the increase in material forming the neck end is not consistent from side to side around the circumference thereof. Because one side surface of the neck end of the cartridge may, thus, be thicker than the other, when the cartridge is chambered, it will position the neck end off center by the amount of uneven thickness which has occurred.

In an attempt to cure the inaccurate circumference of cartridges, conventionally, target shooters who load their own ammunition may employ a lathe-type device which inserts a mandrel in the neck of the case. Once so positioned, a cutting tool acts to cut the metal around the exterior of the mandrel to a uniform case neck thickness. However, during this neck trimming process, where employed to correct an uneven neck thickness from side to side, the correction is achieved by gauging of the inner surface of the neck. This, in turn, can result in an off center exterior circumference neck dimension. Unfortunately, a cartridge suffering this flaw will result in a positioning of the bullet very slightly off center in the chamber of the firearm. For distance target shooting, even this minute lack of concentricity of the interior and exterior of the neck, especially over a long distance, will result in an inaccurate shot.

The forgoing examples of related art in the field of firearm ammunition which employ metal cartridges, and limitations related therewith are intended to be illustrative and not exclusive, and they do not imply any limitations on the device herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art of non concentric neck portions on ammunition cartridges through the provision of a system which concurrently trims the thickness of the metal cartridge around the interior surface of the neck portion thereof, while the exterior circumference thereof is operatively positioned within a die. A length cutter concurrently trims the distal edge of the neck portion to thereby form each cartridge to an equal length between the annular projection at one end thereof to the distal edge of the neck portion.

In use, the device and system herein operatively positions the cartridge and neck portion thereof to a trimming position. During this cutting for concentricity, the metal cartridge is placed in operative contact about the exterior surface thereof with a precision neck sizer and holder, while the neck portion, thereof, is concentrically cut and sized for length using a rotating precision resizing die.

With the cartridge securely located in this trimming position, in contact about the exterior surface thereof with the resizing die, a cutting tool portion thereof, which travels along the center axis of the cartridge is moved into the interior of the neck portion of the cartridge. So positioned, any uneven areas of this neck portion are cut to form a concentric interior neck surface of an even thickness which surrounds the axis of the cartridge. The interior surface of the neck portion is also perfectly concentric and coaxial with the exterior surface of the neck portion of the cartridge. Because the exterior surface of the cartridge, and especially the neck portion, is concurrently in contact with and supported by the resizing die, there is no deformation of any wall surface of the cartridge during this cutting process.

The system employment herein, thus, results in an ammunition cartridge, which is substantially perfectly concentric in the shape of the interior surface of the neck portion and the exterior surface of the neck portion around the center axis of the cartridge. Thus, any projectile or bullet frictionally engaged within the neck portion will have an exterior surface concentrically aligned with both the interior surface of the neck portion and the exterior surface thereof. Once loaded into a chamber, the axis of the cartridge and bullet will align with and will be concentric with the axis of the gun barrel of the firearm, thereby significantly increasing repeatable accuracy during firing of multiple rounds during a competition or for example hunting.

With respect to the above description, before explaining at least one preferred embodiment of the herein disclosed precision ammunition cartridge reaming device and method in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other precision ammunition cartridge reaming devices, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, unless provided with a specific different respective definition, the term "substantially" herein, means plus or minus five percent.

It is an object of this invention to provide a device and method for consistently forming ammunition cartridges to a constant concentric configuration of both an interior and exterior of the neck portion to increase firearm accuracy.

It is a further object of this invention to provide such a cartridge forming device which is configured for engagement to a conventional reloading press to encourage widespread use.

It is a further object of this invention to provide such a cartridge forming device which is easily adapted to any size ammunition cartridge by sizing of the components to accommodate such.

Still further, it is an object of this invention to provide such a cartridge forming device which will also trim each shell to a constant equal length.

These and other objects of the precision ammunition reaming invention herein will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the magnetic chain hook. It is intended that the embodiments and figures disclosed herein are to be considered illustrative rather than limiting.

In the drawings:

FIG. 1 is a cut away side view depicting the device enabling the method herein for precision reaming and trimming of an ammunition cartridge while the cartridge is operatively positioned to a mounted position within a complimentary shaped interior cavity of a body die and aligned with a translating reaming tool, with said reaming tool in a cutting position.

FIG. 2 depicts an exploded view of the components enabling the method herein for forming perfectly concentric ammunition cartridges showing the body die aligned with the piloted reamer with both in axial alignment.

FIG. 3 shows an end view of a conventional ammunition cartridge which has an annular projection thereon which is larger then the circumference of the cartridge and which contacts a first end of the body die during operative positioning of the cartridge into the interior chamber thereof.

FIG. 4 is a top end view of the reaming tool which is translated along the center axis of the interior cavity of the body die and which is rotated with a handle or powered tool such as a drill chuck, when in use.

FIG. 9 depicts the cutting edge located on all modes of the reaming tool herein which is configured to trim the edge of the neck portion of the cartridge to form the cartridge to a constant length.

FIG. 10 depicts the reaming tool of FIGS. 6-8 showing the gap between the interior surface of the neck bushing and the exterior of the replaceable cutting tool into which the neck of the cartridge is positioned during operation of the device.

FIG. 11 shows the neck bushing in a surrounding contact against the exterior surface of the neck portion of the cartridge which allows for the perfectly concentric shape and positioning of the interior circumference of the neck portion relative to the exterior surface thereof.

DETAILED DESCRIPTION OF THE PREFERRED EMBODIMENTS OF THE INVENTION

Figure 5:
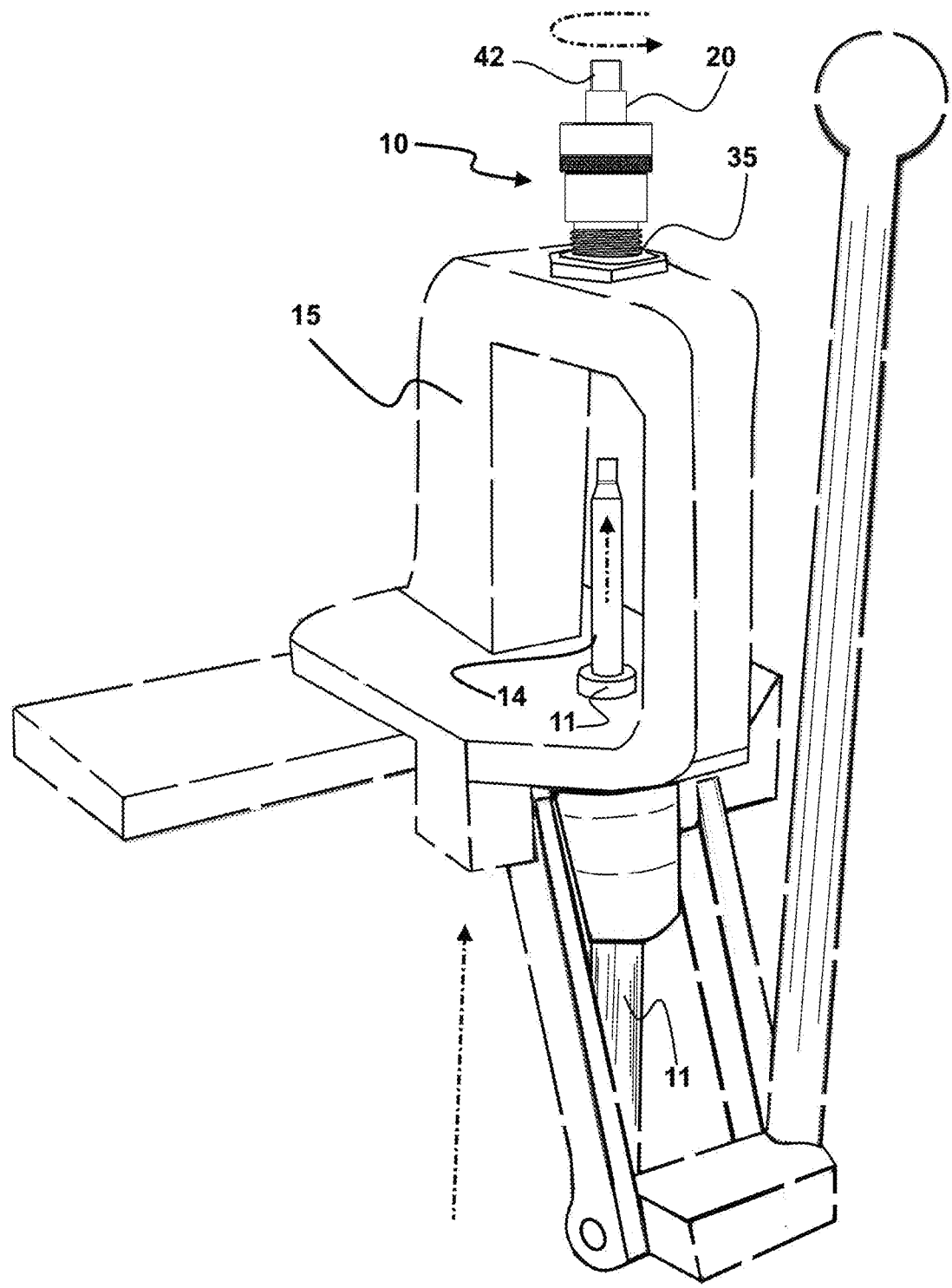
FIG. 5 depicts the device herein in operative engagement with a conventional ammunition reloading press which translates cartridges into and out of the interior chamber of the body die during use.

In this description, the directional prepositions of up, upwardly, down, downwardly, front, back, top, upper, bottom, lower, left, right, first, second, and other such terms refer to the device as it is oriented and appears in the drawings and are used for convenience only. They are not intended to be limiting or to imply that the device has to be used or positioned in any particular orientation.

Now referring to drawings in FIGS. 1-11, wherein similar components are identified with the same numeral, in FIG. 1 is shown the device 10 with a cut away side view of the precision body die 12 showing the interior cavity 13, having the reaming tool 20 operatively positioned therein. As depicted, a metal ammunition cartridge 14 is also shown operatively positioned to a mounted position within an interior cavity 13 of the body die 12.

In use herein, the cartridge 14 is translated into this mounted position within interior cavity 13 of the body die 12 from the first end of the body die 12, by movement of a translating member 11 of a conventional reloading press 15 to which the device 10 is configured for operative engagement as shown in FIG. 5.

Such ammunition cartridges 14 conventionally have a larger diameter lower portion 16 surrounding a chamber 17 into which propellant is loaded using a reloading press 15 such as in FIG. 5. A neck 18 portion of the cartridge 14 has a smaller diameter defined by an interior surface 19 of the neck 18 portion, into which a projectile such as a bullet is frictionally engaged. A circumferential exterior surface 23 of the neck 18 portion defines the exterior surface area of the cartridge 14 which will align with the interior of a gun barrel in which the ammunition cartridge 14 is used. The interior wall 36 defining the complementary shape of the interior cavity 13 forms a contact against the exterior surface 23 of the neck portion 18 with the ammunition cartridge 14 in the mounted position.

In all modes of the device 10 it is operatively engageable with a press such as a reloading press 15 shown in FIG. 5. However, it may also be employed with horizontal mountings to form the ammunition cartridge 14 to the proper overall length, and having concentric neck portion interior surfaces 19 and exterior surfaces 23 such as shown in FIG. 11. Engaging the projectile, such as a bullet, with such a concentrically configured neck 18 portion, insures that the projectile aligns with the center axis 27 of the cartridge 14 which runs through the neck 18 portion.

As also shown in FIG. 1, in the method of employment of the device 10 to both trim the length of cartridges 14 as well as concentrically aligning the circumferential interior surface 19 of the neck 18 portion with the circumferential exterior surface 23 thereby forming a thickness of the neck portion which is equal all the way around the neck portion.

As shown, the cartridge 14 is loaded into the interior cavity 13 from the first end of the body die 12, through an opening 21 at a first end of the body die 12 which communicates with the interior cavity 13 thereof. The interior cavity 13 is shaped with an interior wall 36 to be complimentary to the shape of the exterior of the cartridge 14 and, as noted, form a firm contact against the neck portion 18 and a contact with the lower portion 16 during the reaming and length trimming of the cartridge 14.

In all modes of the device 10, it is configured for operative engagement with a cartridge translating tool, such as a reloading press 15 such as shown in FIG. 5 or other tool which removably engages a cartridge 14 and translates it along a fixed line. By operative engagement is meant that the device 10 has a connector such as threads 33 or a bayonet type mount or another removable mount, which is complementary to a mounting connector 35 (FIG. 5) on the cartridge translating tool.

Such cartridge translating tools removably engage with the cartridge 14 and translate it using a handle or powered translation of a translating member 11. Such translating members 11 are configured to removably engage with an engagement end of the cartridge 14 which is opposite the end having the neck 18 portion. By removable engagement is meant that the cartridge 14, at the engagement end, is placed in a fixed positioning, such as by engagement of the recess 29 adjacent the annular projection 31 at the end of the cartridge 14 opposite the neck 18 portion with a translating member 11 (FIG. 5). Thus, the cartridge 14 will only move in the direction along the cartridge axis 27, the exact distance of translation of the member 11 being translated to which the cartridge 14 is removably engaged.

With the cartridge operatively positioned within the interior cavity 13 of the die 12, as shown, a reaming tool 20 is translated through the interior cavity 13 at the second end of the body die 12 to a cutting position locating the cutting edge 22 within the interior chamber 17 of the ammunition cartridge 14 within and surrounded by the wall forming the neck portion 18, to a cutting position. So translated to the cutting position, and with the reaming tool 20 engaged to a rotating component such as handle or powered rotating component such as a drill head, the cutting edge 22 thereof, rotates with the reaming tool 20 to trim the interior circumferential surface 19 of the neck 18 rendering it concentric around the center axis 27 of the cartridge 14.

Because the exterior circumferential surface 23 of the neck 18 is held in contact with the complementary shaped surface of the interior of the body die 12, during this cutting process, it cannot deform outward. As such, the exterior circumference defined by the exterior surface 23 of the neck 14, remains concentric with the axis 27 of the cartridge 14. Once cut by the reaming tool 20, the interior surface 19 of the neck 18 is formed to a perfectly concentric configuration around the axis 27 of the cartridge 14 and is concentric with and coaxial to the exterior surface 23 of the neck 18 (FIG. 11).

Also shown in FIG. 1 and FIG. 2 is a translation limiter 26 which may be engaged around the exterior circumference of the reaming tool 18 or something in fixed connection therewith, and held in position by a fastener 28, such as a set screw. Once so engaged, the limiter 26 will contact the second end of the body die 12 during translation of the reaming tool 20 into the interior area of the neck 18. This limits the distance of travel of the reaming tool 20 into the interior chamber 17 of the cartridge 14.

As noted, in FIG. 2 is shown an exploded view of the components of one mode of the device 10 enabling the method herein for forming perfectly concentric ammunition cartridges 14. As shown, the reaming tool 20 is poised for translation along a center axis 37 of the interior cavity 13 of the body die 12 which aligns with the center axis 27 of the cartridge 14 once inserted therein. The interior cavity 13 of the die 12 is positioned for insertion of a cartridge 14 therein through the opening 21. Also shown is the limiter 26 and fastener 28 therefor.

Also depicted in FIG. 2 is an edge trimmer 25 (also shown in FIG. 9) which is positioned upon the reaming tool 20 in between the first end thereof where the tool connection 42 is positioned and the second end opposite this first end. The trimmer 25 is configured with cutting portions which will trim the distal edge 30 (FIG. 1 and FIG. 10) of the cartridge 14. When the exterior surface of the cartridge 14 contacts against the interior surface defining the complimentary shape of the interior cavity 13, any portion of the distal edge 30 contacting the edge trimmer 25 will be removed. This trimming action allows for an adjustment of the length of each cartridge 14, whereby each cartridge 14 can be formed to the exact same length. By length of the cartridge 14 is meant, herein, the distance between the endwall 39 adjacent the annular projection 31 and the distal edge 30 of the cartridge 14.

While the device 10 can be provided without this edge trimmer 25 and significantly improve shooting accuracy with the formation of the neck 18, as noted, in a most preferred mode of the device 10 to provide the best consecutive shooting accuracy, it should be included to thereby insure each cartridge 14 is the same length as well as having concentric configurations of the surfaces forming the neck 18.

In FIG. 3 is shown the endwall 39 at the second end of the cartridge which is adjacent or part of the annular projection 31 surrounding a second end of the cartridge 14. As noted, when engaged to the translating member 11 it defines a limiter for the distance of travel of the cartridge 14 into the interior cavity 13 of the die 12, when translated therein through the opening 21 at the first end of the die 12. The circumference of the annular portion 31 is conventionally formed slightly larger than that of the exterior surface of the cartridge 14 adjacent the second end thereof. Thus, contact against the annular portion 31 stops travel of the cartridge 14 into the interior cavity 13.

Depicted in FIG. 4 is a top end view of the reaming tool 20 herein which is configured with a tool connection 42. By tool connection is meant that the tool connection 42 is of a shape and configuration which is configured to engage with a receiver of a powered rotation component such as a handle, a rotating tool, or a drill chuck, which is employed herein to impart rotation to the reaming tool 20 during use herein.

Shown in FIG. 5, as noted, is the device 10 in all modes herein in an operative engagement with a conventional cartridge translating tool, such as a reloading press 15. Such cartridge translating tool engages the second end of the cartridge 14 with a translating member 11, and translates cartridges into and out of the interior cavity 13 of the body die 12 during use.

Figure 6:
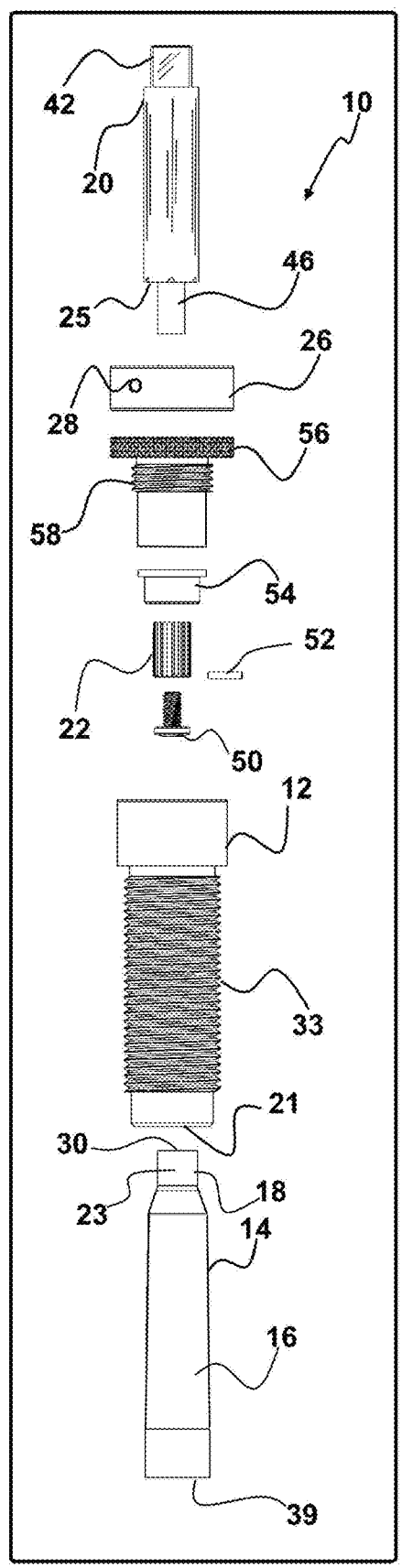
FIG. 6 shows a mode of the device configured for engagement with a conventional reloading press as in FIG. 5, wherein the reaming tool has a removable cutting edge and which has a removable neck collar.
Figure 7:
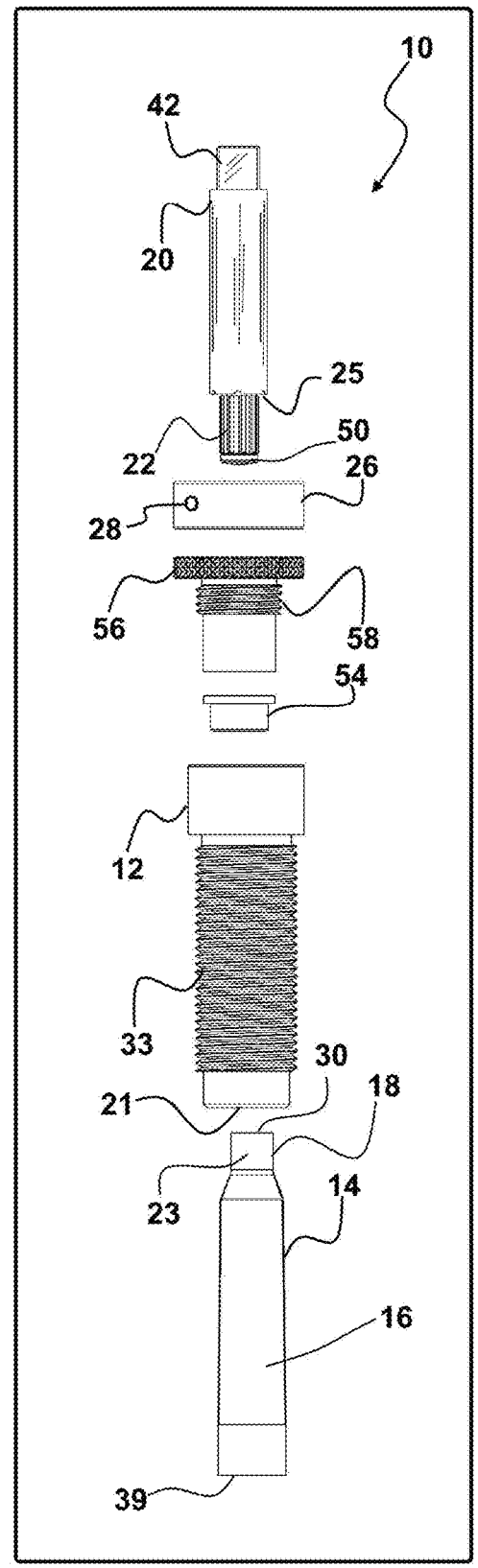
FIG. 7 shows the device as in FIG. 6 depicting the cutting edge operatively engaged upon a projection axially extending from the reaming tool whereby it is replaceable.

Depicted in FIGS. 6-7 is a mode of the device 10 which is configured for engagement with a conventional reloading press as in FIG. 5. This mode of the device 10 operates the same as that of FIGS. 1-3 and includes the body die 12 having an opening 21 for translation of the cartridge 14 into and out of the interior cavity 13. The cutting edge 22 in this mode is removable and replaceable by positioning it upon a projection 46 extending axially from the second end of the reaming tool 20 opposite the first end thereof having the tool connection 42.

The replaceable cutting edge 22 has a passage therethrough sized equal or slightly smaller than a diameter of the projection 46. A connector, such as a screw 50, engages with threads within the projection 46 to hold the cutting edge 22 fixed in position. The connector for the cutting edge 22 may also be or include a shear pin 52 which engages through the removable cutting edge 22 and into an aperture formed in the projection 46.

The translation limiter 26 shown as an engageable collar with a fastener 28 to fix it to the reaming tool 20 is provided and operates once fixed to the reaming tool 20 to stop translation of the reaming tool 20. A neck bushing 54 is positionable into position within a complimentary shaped portion of the interior cavity 13 of the body die 12, and is held in such position by a retainer 56 which engages with mating fasteners such as threads located on the retainer 56 with complimentary mating fasteners such as threads positioned within the internal cavity 13. The neck bushing 54 as can be seen in FIG. 8, has an interior cavity 60 which is sized to form a contact against the exterior surface 23 of the neck portion 18 and hold it during the interior reaming process.

Figure 8:
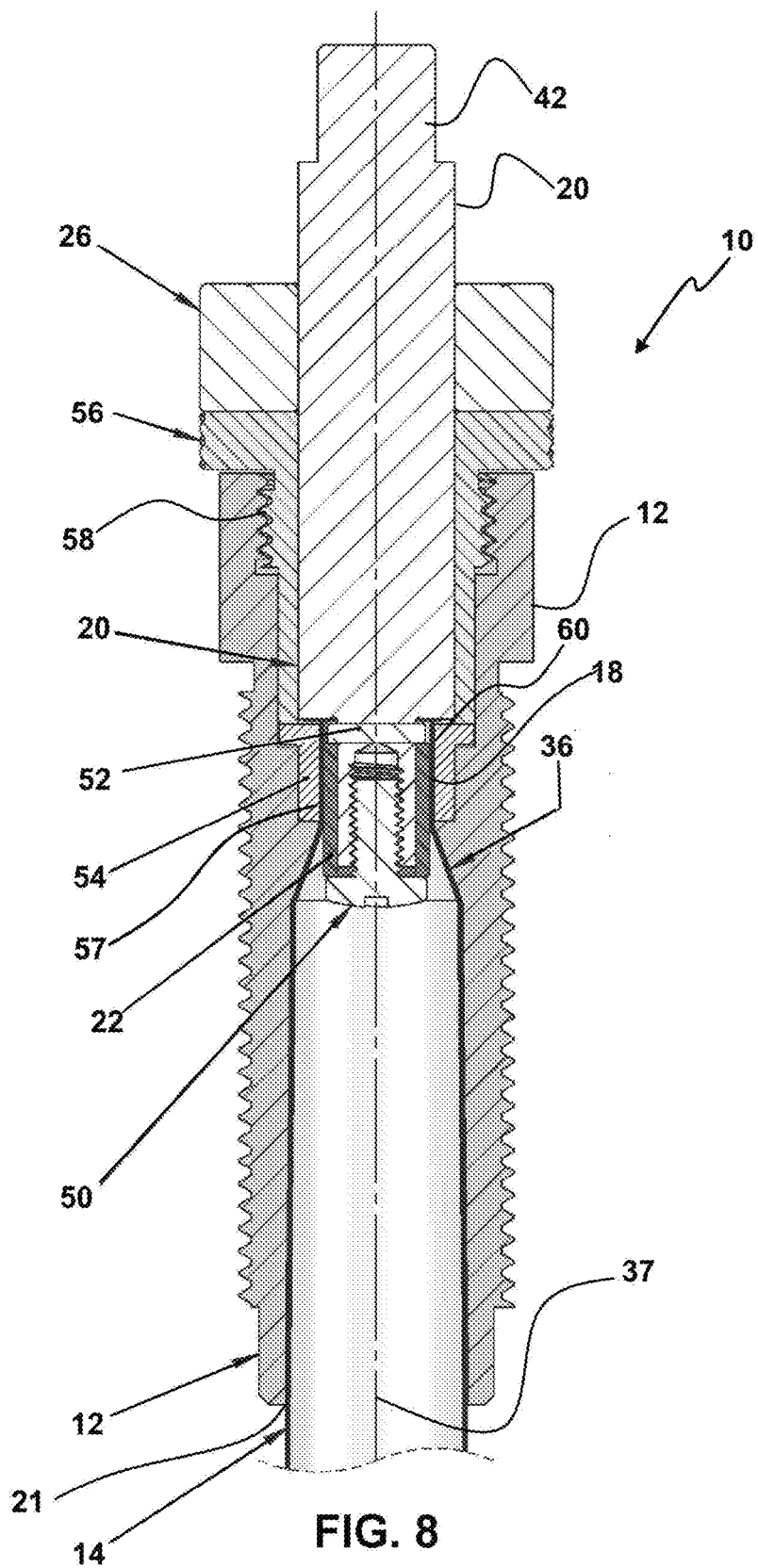
FIG. 8 depicts the mode of the device as in FIGS. 6-7 showing the ammunition cartridge operatively translated into the complimentary shaped interior cavity of the body die with the reaming tool operatively engaged within the neck of the cartridge which has an exterior surface in contact with the neck bushing.

FIG. 8 depicts the mode of the device 10 as in FIGS. 6-7 showing the ammunition cartridge 14 operatively translated into the complimentary shaped interior cavity 13 of the body die 12. As shown, the reaming tool 22 is operatively engaged within and reaming the interior surface 19 of the neck 18 portion of the cartridge 14 which has an exterior surface 23 in contact with the interior surface 57 defining a cavity of the neck bushing 54.

The interior surface 57 of the neck bushing 54 forms passage therethrough and forms the contact against the exterior surface 23 of the neck 18 portion of the inserted ammunition cartridge 14 and can be changed if needed to accommodate cartridges 14 which have had the exterior surface 23 trimmed in an earlier operation.

FIGS. 9-11 depict portions of the device 10 of FIG. 6-8 in perspective positioning. As shown in FIG. 9, the edge trimmer 25 is positioned upon the reaming tool 20 in a fashion similar to that of FIGS. 1-2. As shown the trimmer 25 in the same fashion as that of FIGS. 1-2, is formed by a projecting ledge 62 having a plurality of notches 64 or recesses or teeth thereon, adapted to trim metal from the distal edge 30 of the cartridge 14.

As also shown in FIG. 10, the cutting edge 22 is locateable upon the projection 46 and the neck 18 of the cartridge 14 and is translatable into a slot 53 between the interior surface of the neck bushing 54 and the exterior surface of the cutting edge 22 during operation to form the neck 18 portion with concentric and coaxial inner surface 19 and outer surface 23 (FIG. 11). This same slot 53 area is formed between the cutting edge 22 and the interior wall 36 defining the complimentary shaped interior cavity 13 in FIGS. 1-3.

FIG. 11 depicts the neck bushing 54 in a surrounding contact of an interior surface of the neck bushing 54 which is complementary in shape and size as the exterior surface 23 of the neck portion 18 of the cartridge 14 which remains in contact during reaming, and allows for the perfectly concentric shape and positioning of the interior circumference surface 19 of the neck portion 14 relative to the exterior surface 23 thereof.

While all of the fundamental characteristics and features of the precision ammunition resizing device and the method herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are considered included within the scope of the invention as defined by the following claims.

What is claimed is:

1. A precision ammunition cartridge reaming apparatus, comprising:

a body die, said body die having an interior cavity communicating through said interior cavity from a first end thereof to a second end thereof;

said interior cavity running axially through said body die and having a shape defined by an interior wall surrounding an axis thereof;

a reaming tool, said reaming tool insertable into said interior cavity at said second end of said body die;

said reaming tool having a cutting edge located thereon;

an opening at said first end of said body die forming a path for insertion of an ammunition cartridge into said interior cavity to a mounted position;

said interior wall of said interior cavity forming a contact against an exterior surface of a neck portion of said ammunition cartridge while in said mounted position;

said reaming translatable into an interior chamber of said ammunition cartridge surrounded by an interior surface of said neck portion to a cutting position;

an edge trimmer positioned on said reaming tool;

said edge trimmer contacting a distal edge of said neck portion during said rotation of said reaming tool while in said cutting position, whereby an equal length of said ammunition cartridge, from said distal edge to an endwall on an opposite end of said ammunition cartridge, is formed for each said ammunition cartridge inserted into said interior cavity to said mounted position;

a neck bushing having a passage defined by an interior surface thereof;

said neck bushing removably engageable with said second end of said body die, said interior surface of said neck bushing forming said contact against an exterior surface of a neck portion of said ammunition cartridge; and said cutting edge of said reaming tool trimming said interior surface during a rotation of said reaming tool while in said cutting position, thereby forming an interior circumference of said neck portion defined by said interior surface of said neck portion which is concentric with an exterior circumference of said neck portion defined by said exterior surface of said neck portion.

2. The precision ammunition cartridge reaming apparatus of claim 1 additionally comprising:

a projection extending axially at said first end of said reaming tool; and said cutting edge removably engaged around said projection.

3. A precision ammunition cartridge reaming apparatus, comprising:

a body die, said body die having an interior cavity communicating through said interior cavity from a first end thereof to a second end thereof;

said interior cavity running axially through said body die and having a shape defined by an interior wall surrounding an axis thereof;

a reaming tool, said reaming tool insertable into said interior cavity at said second end of said body die;

said reaming tool having a cutting edge located thereon;

an opening at said first end of said body die forming a path for insertion of an ammunition cartridge into said interior cavity to a mounted position;

said interior wall of said interior cavity forming a contact against an exterior surface of a neck portion of said ammunition cartridge while in said mounted position;

said reaming translatable into an interior chamber of said ammunition cartridge surrounded by an interior surface of said neck portion to a cutting position;

a neck bushing having a passage defined by an interior surface thereof;

said neck bushing removably engageable with said second end of said body die;

said interior surface of said neck bushing forming said contact against an exterior surface of a neck portion of said ammunition cartridge;

a translation limiter positioned upon an exterior surface of said reaming tool;

said translation limiter contacting said second end of said body die to form a stop to translation of said reaming tool into said interior chamber of said ammunition cartridge;

said cutting edge of said reaming tool trimming said interior surface during a rotation of said reaming tool while in said cutting position, thereby forming an interior circumference of said neck portion defined by said interior surface of said neck portion which is concentric with an exterior circumference of said neck portion defined by said exterior surface of said neck portion; and an edge trimmer positioned on said reaming tool;

said edge trimmer contacting a distal edge of said neck portion during said rotation of said reaming tool while in said cutting position, whereby an equal length of said ammunition cartridge, from said distal edge to an endwall on an opposite end of said ammunition cartridge, is formed for each said ammunition cartridge inserted into said interior cavity to said mounted position.

4. The precision ammunition cartridge reaming apparatus of claim 3 additionally comprising:

a projection extending axially at said first end of said reaming tool; and said cutting edge removably engaged around said projection.

5. A precision ammunition cartridge reaming apparatus, comprising:

a body die, said body die having an interior cavity communicating through said interior cavity from a first end thereof to a second end thereof;

said interior cavity running axially through said body die and having a shape defined by an interior wall surrounding an axis thereof;

a reaming tool, said reaming tool insertable into said interior cavity at said second end of said body die;

said reaming tool having a cutting edge located thereon;

an opening at said first end of said body die forming a path for insertion of an ammunition cartridge into said interior cavity to a mounted position;

said interior wall of said interior cavity forming a contact against an exterior surface of a neck portion of said ammunition cartridge while in said mounted position;

said reaming translatable into an interior chamber of said ammunition cartridge surrounded by an interior surface of said neck portion to a cutting position;

a projection extending axially at said first end of said reaming tool;

said cutting edge removably engaged around said projection; and said cutting edge of said reaming tool trimming said interior surface during a rotation of said reaming tool while in said cutting position, thereby forming an interior circumference of said neck portion defined by said interior surface of said neck portion which is concentric with an exterior circumference of said neck portion defined by said exterior surface of said neck portion.

6. The precision ammunition cartridge reaming apparatus of claim 5 additionally comprising:
   a translation limiter positioned upon an exterior surface of said reaming tool; and
   said translation limiter contacting said second end of said body die to form a stop to translation of said reaming tool into said interior chamber of said ammunition cartridge.

7. The precision ammunition cartridge reaming apparatus of claim 6 additionally comprising:
   an edge trimmer positioned on said reaming tool; and
   said edge trimmer contacting a distal edge of said neck portion during said rotation of said reaming tool while in said cutting position, whereby an equal length of said ammunition cartridge, from said distal edge to an endwall on an opposite end of said ammunition cartridge, is formed for each said ammunition cartridge inserted into said interior cavity to said mounted position.

8. The precision ammunition cartridge reaming apparatus of claim 6 additionally comprising:
   a neck bushing having a passage defined by an interior surface thereof;
   said neck bushing removably engageable with said second end of said body die; and
   said interior surface of said neck bushing forming said contact against an exterior surface of a neck portion of said ammunition cartridge.

9. The precision ammunition cartridge reaming apparatus of claim 5 additionally comprising:
   an edge trimmer positioned on said reaming tool; and
   said edge trimmer contacting a distal edge of said neck portion during said rotation of said reaming tool while in said cutting position, whereby an equal length of said ammunition cartridge, from said distal edge to an endwall on an opposite end of said ammunition cartridge, is formed for each said ammunition cartridge inserted into said interior cavity to said mounted position.

10. The precision ammunition cartridge reaming apparatus of claim 5 additionally comprising:
    a neck bushing having a passage defined by an interior surface thereof;
    said neck bushing removably engageable with said second end of said body die; and
    said interior surface of said neck bushing forming said contact against an exterior surface of a neck portion of said ammunition cartridge.

* * * * *